April 7, 1925.
C. N. PETERSON
HOG WATERER
Filed Oct. 29, 1924    2 Sheets-Sheet 1
1,532,940
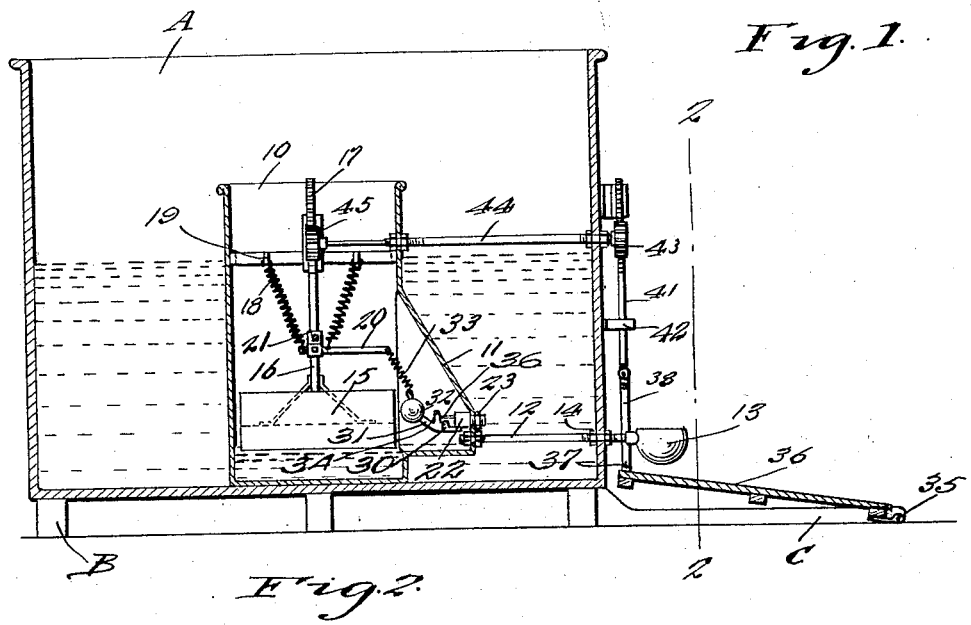
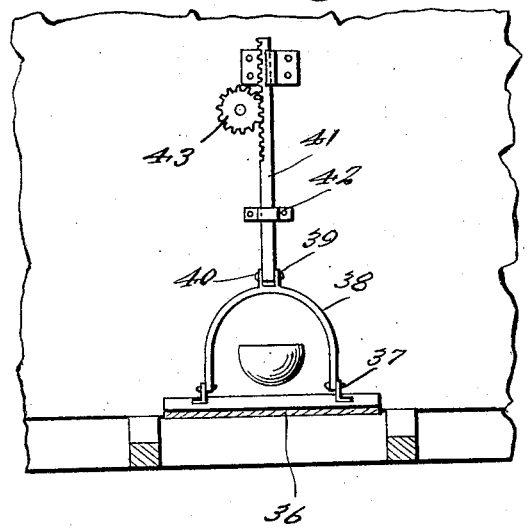
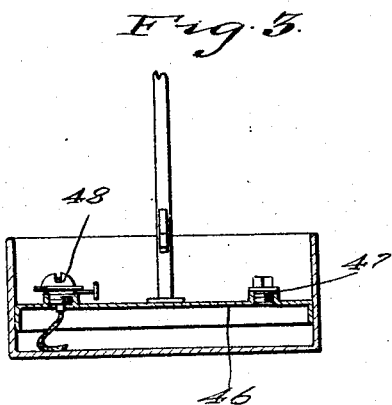
Clarence N. Peterson INVENTOR April 7, 1925.

C. N. PETERSON

HOG WATERER

Filed Oct. 29, 1924

1,532,940

2 Sheets-Sheet 2

Clarence N. Peterson INVENTOR

Patented Apr. 7, 1925.

1,532,940

UNITED STATES PATENT OFFICE.

CLARENCE NOMER PETERSON, OF POLK, NEBRASKA.

HOG WATERER.

Application filed October 29, 1924. Serial No. 746,592.

*To all whom it may concern:*

Be it known that I, CLARENCE NOMER PETERSON, a citizen of the United States, residing at Polk, in the county of Polk, and State of Nebraska, have invented new and useful Improvements in Hog Waterers, of which the following is a specification.

This invention relates to animal watering devices and has for its object the provision of a novel automatically operating device for supplying water to hogs or other animals, the parts being so constructed and arranged as to be actuated when the animal steps upon a treadle located in advance of the trough member.

An important object is the provision of a device of this character which may be installed within an ordinary water tank and which is moreover, provided with heating means whereby the contents of the tank may be heated and consequently be prevented from freezing in cold weather.

Another object is the provision of a device of this character involving a peculiar and novel arrangement of float and valve devices whereby water will be supplied to the trough only when the treadle member is depressed by the weight of an animal standing thereon.

Yet another object is the provision of a device of this character which is so constructed and arranged that the animal cannot have access to the tank proper, a feature of great importance inasmuch as the water will be kept clean and fit for drinking purposes.

An additional object is the provision of a device of this character which will be comparatively simple and inexpensive in manufacture, easy to install, positive in action, efficient and durable in service, and a general improvement in the art.

Figure 4:
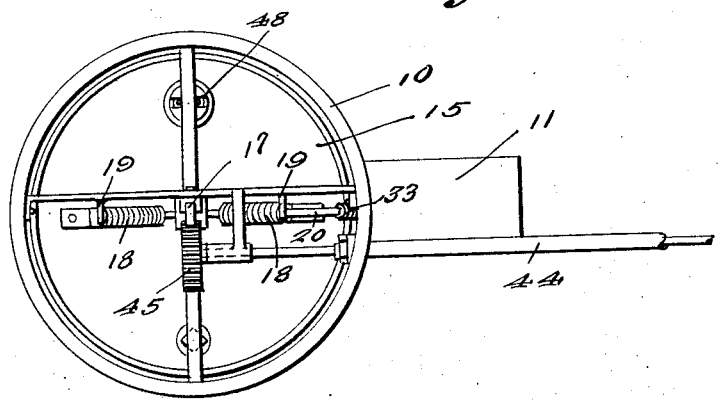
Figures 5, 6:
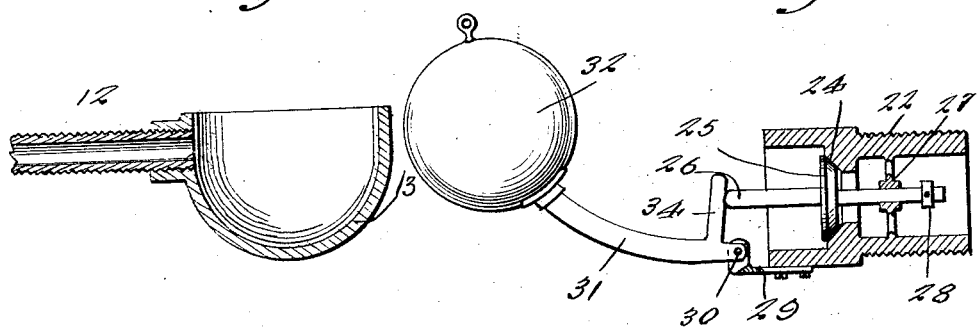

With the above and other objects and advantages in view, the invention consists in the details of construction to be hereinafter more fully described and claimed, and illustrated in the accompanying drawings, in which:

Figure 1 is a vertical longitudinal section through the complete device showing it mounted within a water storage tank, Figure 2 is a section on the line 2—2 of Figure 1, Figure 3 is a detail sectional view through the main float member, Figure 4 is a plan view of the device, Figure 5 is a detail section through the trough and, Figure 6 is a detail sectional view through the water inlet control valve.

Referring more particularly to the drawings, the letter A designates a main tank which is of the type and capacity commonly provided for farm use in watering stock and the like. There is no novelty claimed for this tank but it is shown and described for the reason that the device forming the subject matter of the invention is located within the tank.

In carrying out the invention I provide a receptacle or container 10 adapted to be located within the tank A at some convenient point therein. The receptacle 10 may be of any desired size, shape and material and is provided at one side with an extending portion defining an auxiliary compartment 11 from which leads an outlet pipe 12 extending through the wall of the tank A and carrying a cup or trough 13. Any suitable packing nuts 14 are provided on this pipe 12 for making tight joints where it passes through the compartment 11 and through the wall of the tank A. Slidably mounted within the receptacle 10 is a relatively large or main float 15 provided centrally with an upstanding rod or bar 16 having its upper end toothed to define a rack 17. The float 15 is normally held in elevated position by means of coiled springs 18 secured thereto at some suitable point and connected with stationary supporting elements 19 which are located within the upper portion of the receptacle 10. Carried by the rod or bar 16 is a laterally extending arm 20 for a purpose to be described. The numeral 21 represents a stop which is provided for the purpose of limiting the movement of the float 15 under the influence of the springs 18 as clearly shown in Figure 1.

Extending through the wall of the compartment 11 is a water inlet control valve structure comprising a body 22 held in place by a suitable nut 23 and provided internally with a valve seat 24. Located within the body 22 is a valve 25 co-operating with the seat 24, which valve is carried by a stem 26 which is slidable through a guide spider device 27 located within the body. A stop 28 is provided on this stem adapted to engage the spider 27 for the purpose of limiting the movement of the valve to open position under the influence of the pressure of inrushing water. Secured on the body 22 is a small supporting bracket 29 upon which is pivoted at 30 an arm 31 carrying a float 32 which is connected by means of a coil spring 33 with the free end of the above mentioned arm 20. Ordinarily, the float 15 is in its highest position and the tension of the spring 33 connected with the float 32 will operate to hold the arm 31 in such position that a lateral extension 34 thereon will engage against the end of the valve stem 36 and hold the valve 25 against its seat 24 for preventing the inlet of water through the valve member.

The main tank A is shown as mounted upon a supporting structure B which might be of any preferred form. This supporting structure includes an extension C upon which is pivoted or hinged, at 35, a treadle 36 upon which the hogs or other animals will step when approaching the cup or trough for the purpose of obtaining water. Pivotally connected with treadle as shown at 37 is a preferably U-shaped yoke 38 which straddles the cup or trough 13 and which is provided with spaced ears 39 pivotally connected at 40 with the lower end of a rack bar 41 which is mounted for slidable movement within guide brackets 42 or the like mounted on the side of the main tank A. This rack bar 41 meshes with a pinion 43 on the end of a horizontally disposed shaft 44 which is journaled through the side of the tank A and which projects into the receptacle 10 as clearly shown in Figure 1. Within the receptacle the shaft 44 carries a pinion 45 meshing with the rack bar 17 so that when the treadle is depressed the shaft 44 will be turned and will operate to move the float 15 downwardly.

In the operation of the device, it will be seen that under normal conditions, the treadle 36 is in elevated position and the float 15 is likewise in elevated position owing to the pull exerted by the springs 18. The amount of water within the lower portion of the receptacle 10 is comparatively small and in fact its level is normally such as to just clear the outlet pipe 12 so that no water flows through the pipe 12 into the cup 13. Assuming that a hog or other animal wishes to obtain a drink, the animal will naturally approach the device and when it steps upon the treadle 36 the rack bar 41 will be moved downwardly, causing rotation of the pinion 43, shaft 44 and pinion 45. The rotation of the pinion 45 causes the rack bar 17 to be moved downwardly, forcing the float 15 downwardly. Owing to the fact that the water within the bottom of the receptacle 10 is confined between the bottom and the float 15 it is obvious that when the float is moved downwardly this water will have to be displaced and as there is only one available place for it to flow, namely, the chamber 11, it is quite evident that the water will flow into this chamber and consequently be discharged through the pipe 12 to the cup 13 so that the animal may obtain the desired drink. When the rack bar 17 is moved downwardly as above described, it is quite obvious that the arm 20 will also be moved downwardly, which will result in reducing the tension of the spring 33 upon the float 32. The float 32 is then free to operate to control the level of the water within the chamber or compartment 11 and it is evident that as the water is consumed out of the trough 13, more flows thereinto through the pipe 12, resulting in a decrease in the level of the water within the compartment 11, the float 32 dropping, as is natural, will result in downward swinging movement of the arm 31 so that the lateral projection 34 thereon will move out of engagement with the valve stem 26 and cause the valve 25 to open so that water within the main tank A will flow through the valve device into the compartment or chamber 11 and maintain a constant level therein. As soon as the animal's thirst has been quenched and the animal steps off of the treadle 36, it is evident that the springs 18 will operate to return the float 15 to its normal or elevated position, the water previously within the chamber 11 then flowing by gravity into the lower portion of the receptacle 10 beneath the float 15. At the same time, the upward movement of the arm 20 will increase the tension of the spring 33 upon the float 32 so that the latter will be held in its elevated position with the valve 25 closed so that no additional water may enter the device.

As an additional feature of advantage, I provide heating means for preventing water within the tank A from freezing in severe weather. In carrying out this feature I make use of an oil font 46 suitably located within the float 15 and equipped with a filling opening 47 and a burner 48. Obviously when this burner is lit the heat generated within the receptacle 10 will operate to heat all the water within the tank A so that freezing will be positively prevented.

From the foregoing description and a study of the drawings it will be apparent that I have thus provided a simply constructed, inexpensive and automatically acting watering device for watering hogs or in fact any other animals in a very efficient and sanitary manner. Attention is called to the fact that the device needs no attention whatsoever after it is once set in operation and the tank filled inasmuch as all the movable parts are actuated by stepping of the animal upon the treadle. Owing to the comparative simplicity of the construction and the fewness and ruggedness of the parts, it is quite evident that there will be very little to get out of order so that the device will have a long and satisfactory life.

While I have shown and described the preferred embodiment of the invention, it should be understood that I reserve the right to make such changes in the form, construction and arrangement of parts as will not depart from the spirit of the invention and the scope of the subjoined claims.

Having thus described the invention, I claim:

1. In a device of the character described, a receptacle provided at one side with an auxiliary chamber having its bottom at a higher level than the bottom of the receptacle itself, an outlet pipe leading from said chamber and carrying a trough, a normally elevated float located within the receptacle, and treadle actuated means operatively connected with said float for moving the same downwardly and forcing the water therebelow into said chamber.

2. In a device of the character described, a receptacle provided at one side with an auxiliary chamber having its bottom at a higher level than the bottom of the receptacle itself, an outlet pipe leading from said chamber and carrying a trough, a normally elevated float located within the receptacle, and treadle actuated means operatively connected with said float for moving the same downwardly and forcing the water therebelow into said chamber, and a float controlled inlet valve for the chamber, in combination with a tank containing water and within which the receptacle is immersed.

3. In a device of the character described, a receptacle provided at one side with an auxiliary chamber having its bottom at a higher level than the bottom of the receptacle itself, an outlet pipe leading from said chamber and carrying a trough, a normally elevated float located within the receptacle, treadle actuated means operatively connected with said float for moving the same downwardly and forcing the water therebelow into the chamber, and a float controlled inlet valve for the chamber, in combination with a tank containing water and within which the receptacle is immersed, and an operative connection between the float and said valve for holding the latter closed when the former is elevated.

4. In a device of the character described, a water tank, a receptacle located within the tank and having a chamber at one side thereof with a bottom at a higher plane than the bottom of the receptacle, an outlet pipe leading from said chamber through the wall of the tank and carrying a trough, a normally upwardly spring pulled float located within the receptacle and resting upon the water at the bottom thereof, a pivoted treadle located adjacent the trough, an operative connection between the treadle and the float for moving the latter downwardly when the former is depressed, and a float actuated inlet valve within said chamber operatively connected with the float.

5. In a device of the character described, a water tank, a receptacle located within the tank and having a chamber at one side thereof with the bottom at a higher plane than the bottom of the receptacle, an outlet pipe leading from said chamber through the wall of the tank and carrying a trough, a normally upwardly spring pulled float located within the receptacle and resting upon the water at the bottom thereof, a pivoted treadle located adjacent the trough, an operative connection between the treadle and the float for moving the latter downwardly when the former is depressed, and a float actuated inlet valve within said chamber operatively connected with the float, the operating means for the float comprising an upstanding slidably mounted rack operatively connected with the treadle, a shaft journaled through the receptacle and tank, a pinion on one end of said shaft meshing with said rack, a pinion on the other end of the shaft, and a rack bar connected with the float and meshing with the second named pinion.

In testimony whereof I affix my signature.

CLARENCE NOMER PETERSON.